(12) United States Patent
Iwane

(10) Patent No.: US 8,098,984 B2
(45) Date of Patent: Jan. 17, 2012

(54) FOCUS DETECTING APPARATUS AND AN IMAGING APPARATUS

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 156 days.

(21) Appl. No.: 12/585,389

(22) Filed: Sep. 14, 2009

(65) Prior Publication Data

US 2010/0086293 A1    Apr. 8, 2010

(30) Foreign Application Priority Data

Oct. 2, 2008   (JP) ................................. 2008-257694

(51) Int. Cl.
*G03B 3/10*  (2006.01)
(52) U.S. Cl. ........................................ 396/121; 348/349
(58) Field of Classification Search ............... 396/91, 396/111, 121–123, 125; 348/349, 350
See application file for complete search history.

(56) References Cited

U.S. PATENT DOCUMENTS

| 4,812,868 A | 3/1989 | Utagawa et al. |
| 6,072,956 A * | 6/2000 | Hamada et al. ............... 396/123 |
| 2008/0205871 A1* | 8/2008 | Utagawa ....................... 396/125 |

FOREIGN PATENT DOCUMENTS

JP   A-62-227108   10/1987

* cited by examiner

*Primary Examiner* — Clayton E LaBalle
*Assistant Examiner* — Autumn Parker
(74) *Attorney, Agent, or Firm* — Oliff & Berridge, PLC

(57) ABSTRACT

Disclosed is a focus detecting apparatus detecting an image offset of an optical system. The apparatus comprises a micro lens array arranged with a plurality of micro lenses, a photodetector having a plurality of detecting elements provided so as to correspond to each of the plurality of micro lenses and receiving an optical beam from the optical system via the micro lenses, and a calculator that selects a pair of detecting elements from the plurality of detecting elements in accordance with a plurality of aperture values of the optical system and calculates an image offset of the optical system based on outputs from the pair of detecting elements. The pair of detecting elements receive respectively a pair of optical beams passing through different areas of the optical system.

9 Claims, 9 Drawing Sheets

| Pixel spacing (pixels) | 2 | 4 | 6 | 8 | 10 |
|---|---|---|---|---|---|
| Pixel spacing (μm) | 6.4 | 12.8 | 19.2 | 25.6 | 32 |
| Aperture value F | 14 | 7 | 4.7 | 3.5 | 2.8 |

Micro lens focal distance = 90 μm

FOCUS DETECTING APPARATUS AND AN IMAGING APPARATUS

BACKGROUND OF THE INVENTION

1. Field of the Invention

The present invention relates to a focus detecting apparatus and an imaging apparatus.

2. Related Background of the Invention

There is known a camera system capable of correcting a defocus amount in accordance with a spherical aberration of an imaging optical system and detecting an optimum focusing position (Japanese Unexamined Patent Publication (Kokai) No. 62-227108). The camera system has a lens barrel in which spherical aberration correcting data values corresponding respectively to two F values are stored. Then, these two spherical aberration correcting data values are read out into a camera body mounted with the lens barrel. The camera body has a focus detecting optical system with unique full aperture F value, and after determining an optimum weighting coefficient according to the full aperture F value, each of the two spherical aberration correction data values is multiplied by the weighting coefficient. In this way, there is calculated a spherical aberration correcting amount optimum for the focus detecting optical system.

However, the spherical aberration correcting amount obtained in the above-mentioned prior art camera system is calculated equally, and differs from a correcting amount for the focus detecting optical system, unique to each lens barrel.

SUMMARY OF THE INVENTION

The object of the present invention is, therefore, to provide a focus detecting apparatus and an imaging apparatus capable of correcting with high accuracy a defocus amount in accordance with a spherical aberration of an imaging optical system.

According to the present invention, the object is achieved as described hereinafter.

The present invention provides a focus detecting apparatus. The focus detecting apparatus includes a micro lens array, a photo-detector, and a calculator. The micro lens array is arranged with a plurality of micro lenses. The photo-detector has a plurality of detecting elements provided so as to correspond to each of the plurality of micro lenses, and receives an optical beam from an optical system via the micro lenses. The calculator selects a pair of detecting elements from the plurality of detecting elements in accordance with a plurality of aperture values of the optical system, and calculates an image offset of the optical system based on outputs from the pair of detecting elements. The pair of detecting elements receive respectively a pair of optical beams passing through different areas of the optical system.

In the focus detecting apparatus according to the present invention, the calculator may be provided so as to calculate a plurality of image offsets corresponding to the plurality of aperture values, and further calculate an image offset corresponding to a specific aperture value based on a calculation result of the plurality of image offsets.

In the focus detecting apparatus according to the present invention, the calculator may be provided so as to calculate the image offset of the optical system based on outputs from the plurality of detecting elements corresponding to a micro lens. The micro lens is selected from the plurality of the micro lenses in accordance with an image height of an image obtained by the optical system.

In the focus detecting apparatus according to the present invention, the calculator may be provided so as to calculate a plurality of image offsets corresponding to the plurality of aperture values, and further calculate an image offset corresponding to a specific aperture value different from the plurality of aperture values based on a calculation result of the plurality of image offsets.

In the focus detecting apparatus according to the present invention, the calculator may be provided so as to select different pairs of the detecting elements in accordance with an arrangement position of the micro lenses on the micro lens array.

The present invention also provides an imaging apparatus including the focus detecting apparatus according to the present invention and an imaging unit taking an image from the optical system.

In the imaging apparatus according to the present invention, the calculator may be provided so as to obtain the image offset corresponding to a controlled aperture value of the optical system in case of shooting by the imaging unit, and to detect a focusing adjustment status in accordance with the obtained image offset.

The imaging apparatus according to the present invention may further includes a contrast detector that detects a contrast of an image obtained by the optical system based on an output from the photo-detector corresponding to the micro lenses. The focus detecting apparatus may be provided so as to detect a focusing adjustment status based on an output from the photo-detector of which the contrast detected by the contrast detector is not less than a predetermined value.

The imaging apparatus according to the present invention may further includes a storage unit that stores the image offset calculated by the calculator in accordance with the plurality of aperture values.

DESCRIPTION OF THE PREFERRED EMBODIMENTS

Hereinafter, embodiments of the present invention will be described with reference to the drawings.

Although the embodiments will be hereinafter described with reference to the drawings where the present invention is applied to a single-lens reflex digital camera with an interchangeable lens, the present invention is applicable to any imaging apparatus which performs focusing adjustment of a shooting lens or to a camera with a non-retractable lens.

Figure 1:
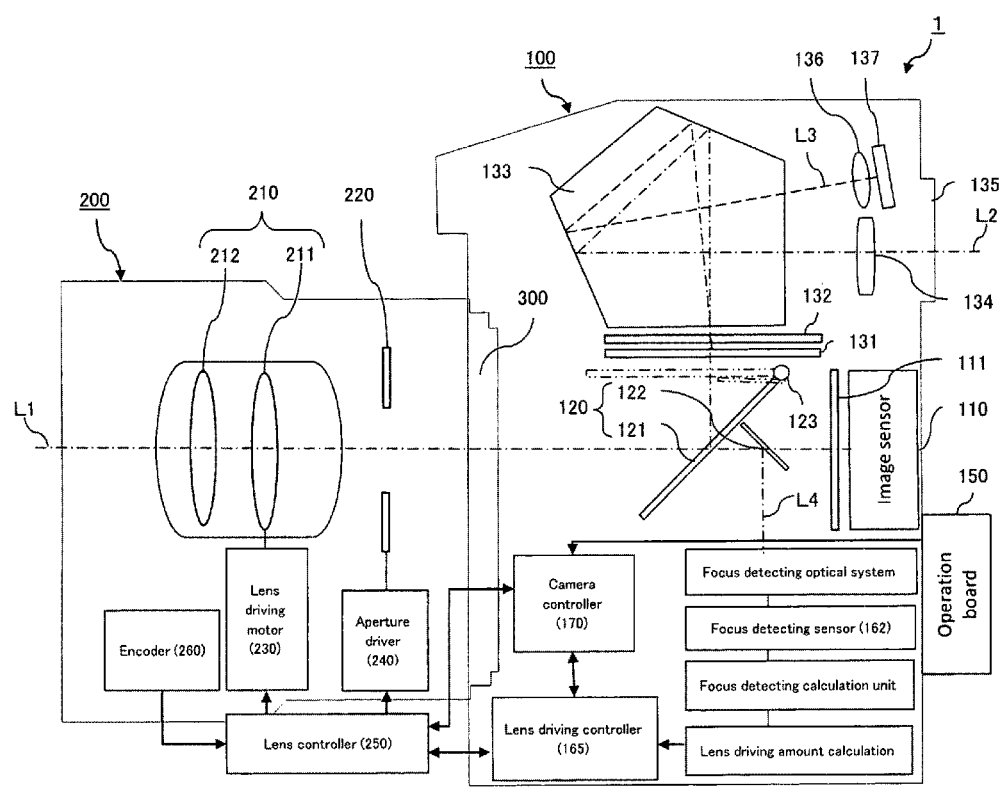
FIG. 1 is a block diagram illustrating a single-lens reflex digital camera according to an embodiment of the present invention.

FIG. 1 is a block diagram illustrating a single-lens reflex digital camera 1 (hereinafter referred to as simply "camera 1") according to the embodiment of the present invention. The description will be directed in particular to elements forming part of, or cooperating directly with, the focus detecting apparatus and the imaging apparatus in accordance with the present invention. It is to be understood that elements not specifically illustrated or described, such as general configuration of a camera, may take various forms well known to those of ordinary skill in the art.

The camera 1 according to the present embodiment has a camera body 100 and a lens barrel 200. The camera body 100 and the lens barrel 200 are detachably jointed to each other by means of a mount 300.

In the lens barrel 200, there are embedded a shooting optical system which has shooting lenses 210 including a focus lens 211 and a zoom lens 212, an aperture device 220, and so forth.

The focus lens 211 is provided movably along with an optical axis L1 thereof, and the position of the focus lens 211 is adjusted by a lens driving motor 230 while the position or the travel distance of the focus lens 211 is detected by an encoder 260. The focus lens 211 is movable in the direction of the optical axis L1 by rotation of a rotating barrel from an end position facing to the camera body (near end) to an end position facing to a subject (far end). Incidentally, an information regarding the position or the travel distance of the focus lens 211 detected by the encoder 260 is transmitted via a lens controller 250 to a lens driving controller 165. In addition, the lens driving controller 165 transmits a driving signal to the lens driving motor 230 via the lens controller 250 in accordance with a driving distance and/or a driving speed calculated based on a focus detecting result described hereinafter, and the lens driving motor 230 is driven by the driving signal.

The aperture device 220 has a configuration with an adjustable aperture size centering around the optical axis L1 so as to limit an amount of light beam that reaches an image sensor 110 via the above-mentioned shooting optical system. The adjustment of the aperture size in the aperture device 220 is accomplished by obtaining a signal in accordance with an aperture value calculated in an automatic exposure mode, for instance, and transmitting the obtained signal from a camera controller 170 to an aperture driver 240 via the lens controller 250. Alternatively, the adjustment of the aperture size may be accomplished by setting an aperture value by manual operation at an operation board 150 provided on the camera body 100, and transmitting the set aperture value from the camera controller 170 to the aperture driver 240 via the lens controller 250. The aperture size of the aperture device 220 is detected by an aperture size detector not shown, and the present aperture size is recognized by the lens controller 250.

The lens controller 250 is provided in the lens barrel 200. The lens controller 250 is configured with peripheral parts including a microprocessor, memories, and so forth, is electrically connected to the camera controller 170, receives an information regarding a defocus value, an aperture controlling signal, and so forth from the camera controller 170, and transmits a lens information, such as a full aperture F value unique to the shooting lenses 210, to the camera controller 170.

Meanwhile, the camera body 100 is provided with a mirror system 120 for guiding the light beam from a subject to the image sensor 110, a view finder 135, a photometric sensor 137, and a focus detecting optical system 161. The mirror system 120 includes a quick return mirror 121 pivotally provided around a pivot axis 123 within a predetermined angular range between an observing position to the subject and a shooting position to the subject, and a sub mirror 122 pivotally provided on the quick return mirror 121 and moving pivotally in synchronization with the quick return mirror 121.

FIG. 1 illustrates two statuses of the mirror system 120, one for the observing position to the subject indicated by solid lines and the other for the shooting position to the subject indicated by two-dot chain lines. The mirror system 120 moves pivotally between the two statuses, that is, in the observing position to the subject, the mirror system 120 is positioned on an optical path of the optical axis L1, and in the shooting position to the subject, the mirror system 120 escapes from the optical path of the optical axis L1.

The quick return mirror 121 is configured as a half mirror, and, in the status of the observation position to the subject, the quick return mirror 121 reflects and guides certain optical beams (optical axes L2 and L3) extracted from the optical beam from the subject (optical axis L1) to the view finder 135 and the photometric sensor 137, respectively, and transmits the residual optical beam (optical axis L4) to be guided to the sub mirror 122. In contrast, the sub mirror 122 is configured as a total reflection mirror, and guides the residual optical beam (optical axis L4) transmitted through the quick return mirror 121 to the focus detecting optical system 161.

Accordingly, when the mirror system 120 is positioned at the observing position, the optical beam from the subject (optical axis L1) is guided to the view finder 135 and the focus detecting optical system 161, then the subject is observed by a photographer, and a calculation of exposure and a detection for a focusing adjustment status of the focus lens 211 are performed. And when the photographer presses a release button fully, the mirror system 120 moves pivotally to the shooting position, the optical beam (optical axis L1) from the subject is guided to the image sensor 110, and the relevant image data is stored into a memory not shown.

The image sensor 110 is provided in the camera body 100, on the optical axis L1 of the optical beam from the subject, and at the position to be a possible focusing plane, and a shutter 111 is provided facing to the front surface of the image sensor 110. The image sensor 110 has a plurality of photo-electric conversion elements arranged two-dimensionally, and may be configured as a two-dimensional CCD image sensor, a MOS sensor, a CID, or the like.

When a shutter button included in the operation board 150 is pressed fully (that is, when the release button is pressed fully), the shutter 111 provided facing to the front surface of the image sensor 110 is released during the period set by the photographer or based on an exposure calculation result so as to expose the image sensor 110. The image sensor 110 photoelectrically converts the incident optical image into an electrical image signal, and the electrical image signal is stored into a memory not shown after image processing in the camera controller 170. It is to be noted that the memory storing the electrical image signal may be provided as a built-in memory, a card type memory, or the like.

On the other hand, the optical beam reflected by the quick return mirror 121 from the subject forms an image on a focal plane plate 131 arranged at a plane equivalent optically to the image sensor 110, then guided into an ocular globe of the photographer via a pentagonal prism 133 and an ocular lens 134. At this time, a transmissive type liquid crystal display device 132 superimposes a display such as a focus detecting area mark onto an image of the subject on the focal plane plate 131, and displays an information relevant to shooting, such as a shutter speed, an aperture value, and the number of shootings, on an outer area not overlapping the image of the subject. This allows the photographer to observe both the subject and the back-ground thereof, and the information relevant to the shooting or the like, through the view finder 135 in a shooting standby status.

The photometric sensor 137 is configured as a two-dimensional color CCD image sensor or the like, has a plurality of areas divided on the shooting image, and outputs a photometric signal in accordance with the luminance of each area. Image information obtained in the photometric sensor 137 is output to the camera controller 170, and the image information is utilized for an automatic exposure control.

The operation board 150 includes the shutter release button and input switches for the photographer to set various operating modes, and enables the photographer to select from AUTO FOCUS MODE/MANUAL MODE, or select from ONE SHOT MODE/CONTINUOUS MODE especially in the AUTO FOCUS MODE. When the shutter release button is pressed fully, the shutter operation is switched ON such that the shutter is released. Other than those described above, when the shutter release button is half-pressed in the AUTO FOCUS MODE, the focusing operation of the focus lens is switched ON, whereas pulling away from the shutter release button switches OFF the focusing operation. Information relevant to various modes set by means of the operation board 150 is sent to the camera controller 170, and the camera controller 170 controls generally the operation of the camera 1.

The camera controller 170 is provided in the camera body 100. The camera controller 170 is configured with peripheral parts including a microprocessor, memories, and so forth, is electrically connected to the lens controller 250 via an electric signal connector provided on the mount 300, receives the lens information from the lens controller 250, and sends the information regarding the defocus value, the aperture controlling signal, and so forth to the lens controller 250. In addition, the camera controller 170 reads out the image information from the image sensor 110 as described above, and after information processing for the image information if required, the image information is output to a memory not shown. Furthermore, the camera controller 170 corrects the shooting image information and detects a status of focusing adjustment of the lens barrel 200, a status of aperture adjustment, and so forth, thereby ruling general control of the camera 1.

In the present embodiment as illustrated in FIG. 1, the focus detecting apparatus of phase difference detecting type includes the focus detecting optical system 161, a focus detecting sensor 162, a focus detecting calculation unit 163, and a lens driving amount calculation unit 164, thus the focus detecting apparatus detects and determines a defocus amount representing the states of focusing adjustment of the shooting lenses 210.

The focus detecting apparatus according to the present embodiment will be described with reference to FIGS. 2 to 3D.

Figure 2:
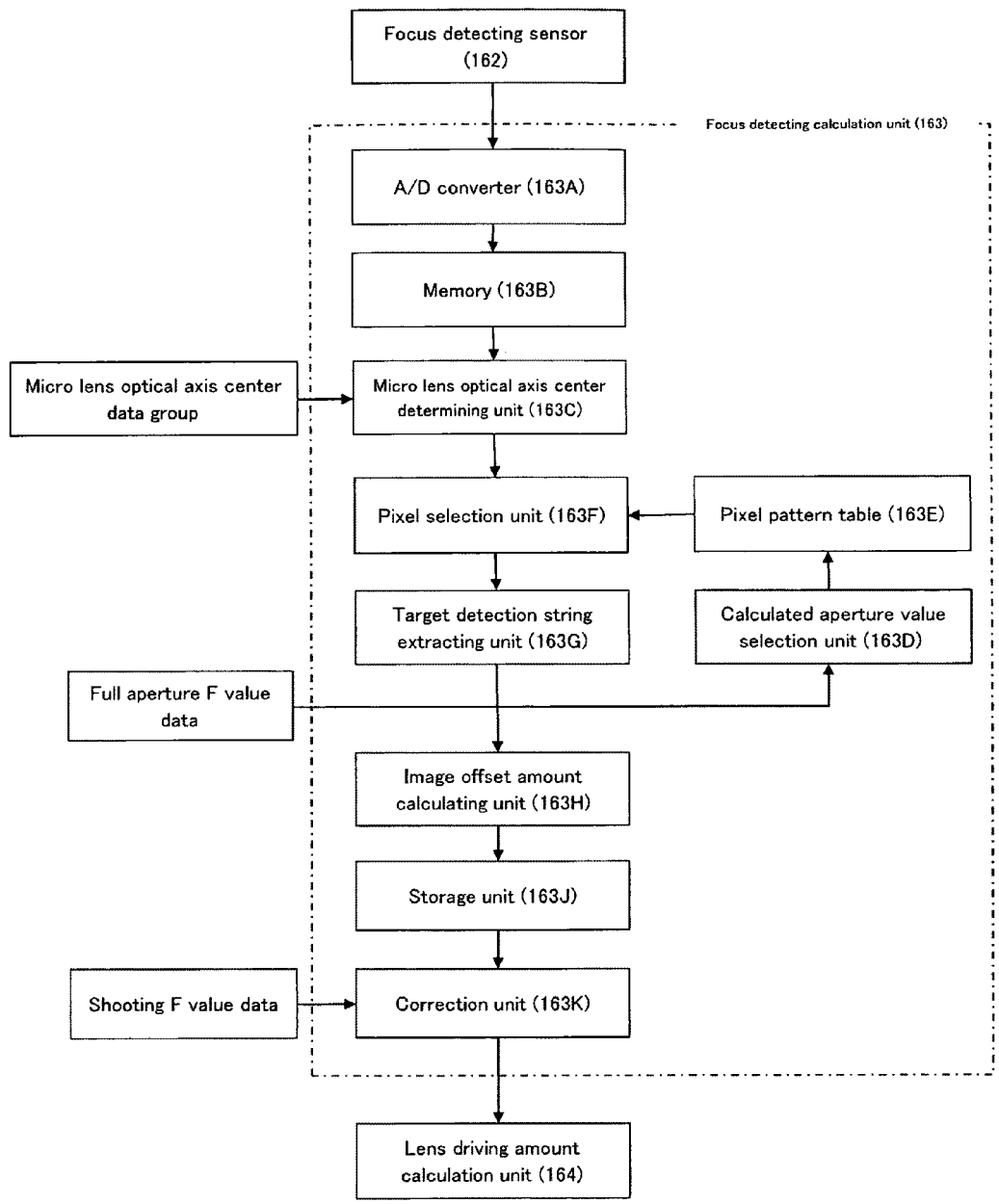
FIG. 2 illustrates the configuration of a focus detecting apparatus provided in the camera illustrated in FIG. 1.
Figure 3A:
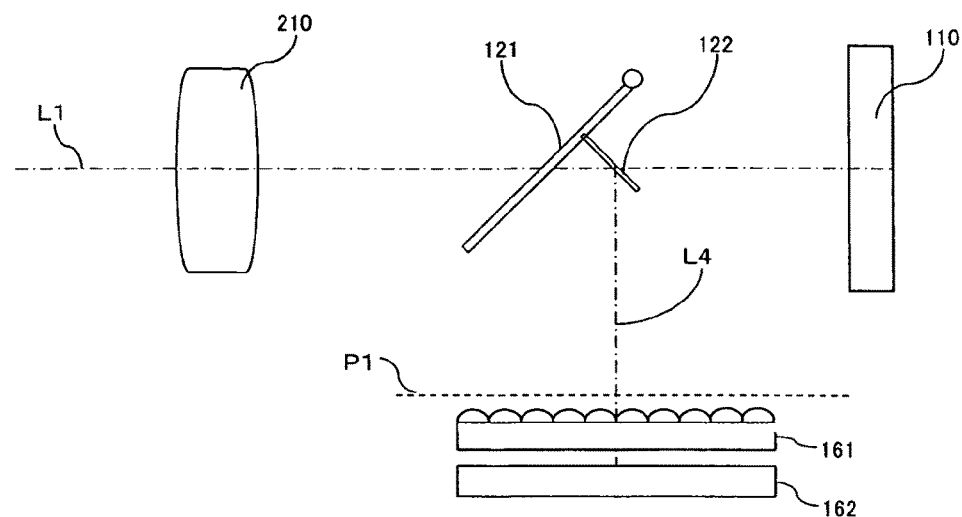
FIG. 3A illustrates an optical arrangement of the focus detecting apparatus provided in the camera illustrated in FIG. 1.
Figure 3B:
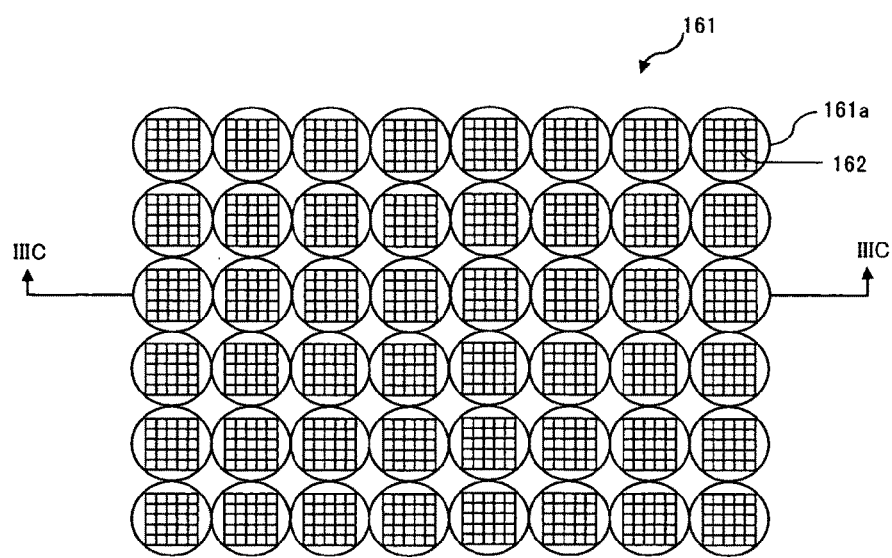
FIG. 3B is a plan view illustrating a placement relationship of a focus detecting optical system and a focus detecting sensor provided in the camera illustrated in FIG. 1.

FIG. 2 is a block diagram illustrating the configuration of the focus detecting apparatus, where the configuration of the focus detecting calculation unit 163 illustrated in FIG. 1 is indicated in detail according to a processing procedure thereof. FIG. 3A illustrates an optical arrangement of the focus detecting apparatus, FIG. 3B is a plan view illustrating a placement relationship of the focus detecting optical system 161 and the focus detecting sensor 162 seen from the sub mirror 122 to the focus detecting optical system 161, FIG. 3C is a cross-sectional view illustrating the focus detecting optical system 161 and the focus detecting sensor 162 (along line IIIC-IIIC in FIG. 3B), and FIG. 3D is an enlarged plan view illustrating one micro lens 161a and focus detecting sensor 162.

The focus detecting optical system 161 is provided as a micro lens array having a plurality of micro lenses 161a densely arranged in a matrix in a two-dimensional plane, and is allocated adjacent to a position P1 to be a possible focusing plane. Hereinafter, the focus detecting optical system 161 is also referred to as the micro lens array 161. Although the micro lens array 161 may be positioned just on the position P1 to be the possible focusing plane, the micro lens array 161 may be positioned alternatively on a point shifted from the point P1 to be the possible focusing plane. Positioning just on the position P1 may causes a dead zone where the contrast in an image of the subject exists between micro lenses 161a, whereas shifted positioning from the position P1 may avoid the appearance of such dead zones.

Figure 3C:
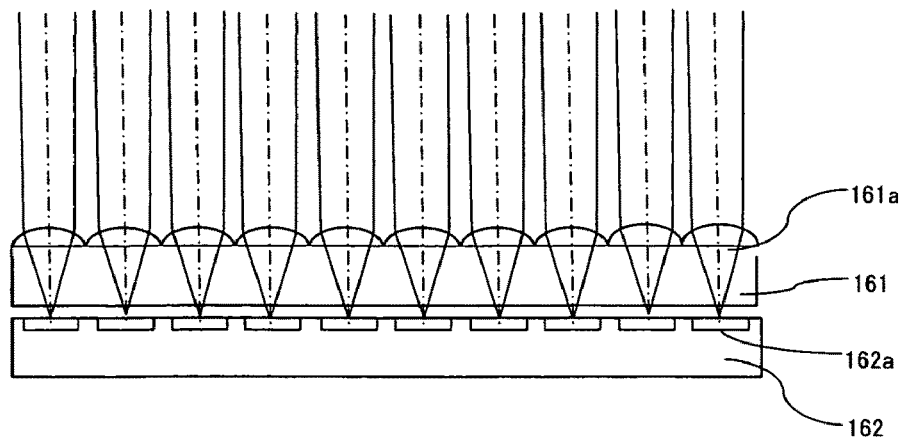
FIG. 3C is a cross-sectional view illustrating the focus detecting optical system and the focus detecting sensor provided in the camera illustrated in FIG. 1.
Figure 3D:
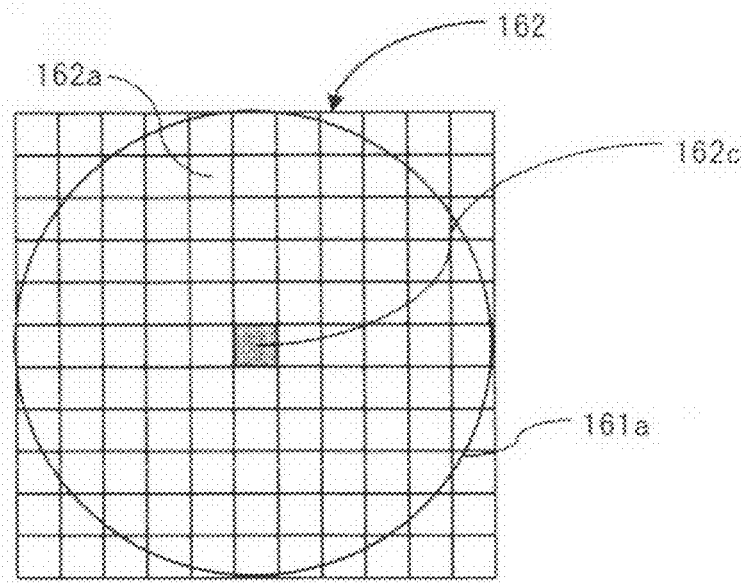
FIG. 3D is an enlarged plan view illustrating a certain portion of the focus detecting optical system and one focus detecting sensor provided in the camera illustrated in FIG. 1.

The focus detecting sensor 162 is provided as a photodetector array having a plurality of photoelectric conversion elements 162a densely arranged in a matrix in a two-dimensional plane, as illustrated in FIG. 3D, and is allocated approximately on focal points of the micro lens array 161, as illustrated in FIG. 3C. Hereinafter, the focus detecting sensor 162 is also referred to as the photo-detector array 162. It is to be noted that FIG. 3C illustrates beam divergences of the optical beams each received by the photoelectric conversion element 162a corresponding to the center or the area adjacent to the center of each micro lens 161a. In addition, photodetector arrays each having a plurality of photoelectric conversion elements 162a may be arranged discretely such that each photo-detector array is allocated as inscribed to one micro lens 161a, as illustrated in FIG. 3B. Alternatively, as illustrated in FIG. 3D, the micro lens array 161 may be provided on a large scale photo-detector array such that assigned areas of the large scale photo-detector array each operates as one photo-detector array corresponding to one micro lens 161*a* (In FIG. 3D, only one micro lens 161*a* and photo-detector elements 162*a* relevant to the micro lens 161*a* are illustrated.).

In the present embodiment, each micro lens 161*a* is a circular formed micro lens, and the micro lens array 161 is provided with such circular formed micro lenses 161*a* arranged in a matrix. Directions of up and down, and left and right indicated in FIG. 3B are similar to those in an image picked up by the image sensor 110. It is to be noted that dead zones of focus detecting possibly caused between circular formed micro lenses may be avoided by, in place of the circular formed micro lenses, arranging regular hexagonal micro lenses 161*a* in a honeycomb structure, as will hereinafter be described in detail.

On the other hand, the photo-detector array 162 provided behind the micro lens array 161 has a plurality of square shaped photoelectric conversion elements 162*a* arranged in a matrix. Each of the photoelectric conversion elements 162*a* is formed smaller than each micro lens 161*a*, and therefore, as illustrated enlargedly in FIG. 3D, a plurality of photoelectric conversion elements 162*a* are included in an area to which one micro lens 161*a* is projected perpendicularly. Thus, these photoelectric conversion elements 162*a* are provided so as to correspond to the micro lens 161*a* relevant thereto.

Incidentally, since the micro lens array 161 is positioned just on or approximately on the position P1 (a plane being optically equivalent to an imaging plane of the image sensor 110) to be the possible focusing plane, an optical image is projected onto the micro lens array 161 similarly onto the image sensor 110. There is obtained a pupil image of the shooting lenses 210 focused onto the photo-detector array 162 by each micro lens 161*a*. Each photoelectric conversion element 162*a* of the photo-detector array 162 corresponds to each part of the pupil, and therefore, selecting photoelectric conversion elements 162*a* in accordance with micro lenses 161*a* and combining signals therefrom enable to obtain an image picked up at a certain aperture determined by the selected photoelectric conversion elements 162*a*.

In the present embodiment, focus detecting is accomplished according to the process described hereinafter.

As illustrated in FIG. 2, the focus detecting calculation unit 163 includes an A/D converter 163A which converts an analog image signal output from the focus detecting sensor (photo-detector array) 162 to a digital image signal to be output into a memory 163B. The memory 163B outputs the digital image signal responding to a demand from a micro lens optical axis center determining unit 163C.

Figures 4, 5:
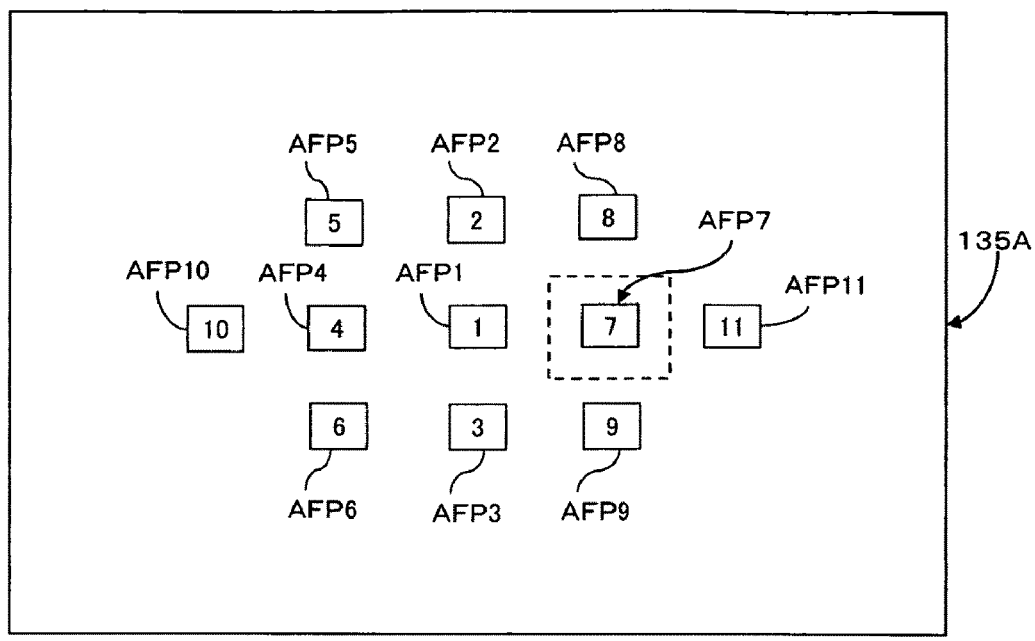
FIG. 4 illustrates a shooting screen observed through a view finder illustrated in FIG. 1.
FIG. 5 illustrates a relationship between a pixel spacing and an aperture value in the focus detecting apparatus illustrated in FIG. 1 as a table.

At this time, if one area is selected from focus detecting areas (or auto focus points) AFP1 to AFP11 indicated in FIG. 4, then the outputs are read out only from the photoelectric conversion elements 162*a* corresponding to the micro lens (es) 161*a* in a specific area determined by the selected focus detecting area.

FIG. 4 illustrates a shooting screen 135A including focus detecting areas AFPs observed through the view finder 135, where the focus detecting areas AFP 1 to AFP 11 are provided at predetermined eleven points in the shooting screen 135A in this case. This indication is accomplished by the liquid crystal display device 132 to superimpose eleven marks showing the positions of the focus detecting areas on a subject image projected on the focal plane plate 131. Then, a photographer selects a desired focus detecting area AFP by handling the operation board 150, or an appropriate focus detecting point AFP is automatically selected by a predetermined sequence based on a data, such as an automatic exposure data. For instance, when the focus detecting area AFP7 is selected as illustrated in FIG. 4, the outputs are read out from the photoelectric conversion elements 162*a* corresponding to the micro lens(es) 161*a* in a specific area (indicated by dashed line in FIG. 4) centered on the focus detecting point AFP7.

At this moment, it is required to calculate a pupil center position of the shooting lenses 210. This is because, in general, the micro lens array 161 and the photo-detector array 162 are assembled after being manufactured independently, and therefore it is uncertain that each photoelectric conversion element 162*a* corresponds to which micro lens 161*a* and to which position on the corresponding micro lens 161*a*. Moreover, because it is expected that the lens barrel 200 is interchanged for the single-lens reflex camera 1, the position of a pupil of the shooting lenses 210 observed at each micro lens 161*a* possibly changes. Therefore, the micro lens optical axis center determining unit 163C determines a position of the photoelectric conversion element 162*a* having a conjugate relationship with respect to the center position of the pupil of the shooting lenses 210 as a center of the micro lens 161*a*.

The position of the photoelectric conversion element 162*a* corresponding to the center of each micro lens 161*a* may be obtained in accordance with the position (image height) of the micro lens 161*a* from the optical axis L1 of the shooting lenses 210 and a distance from the micro lens 161*a* to the pupil of the shooting lenses 210. For instance, when a lens barrel with known distance from the micro lens 161*a* to the pupil of the shooting lenses 210 is used, the center position of the present shooting lenses 210 is calculated by memorizing preliminarily a data group relevant to the center position of each micro lens 161*a* in the memory of the lens controller 250 or the like, and calculating by means of an interpolation or an extrapolation based on the distance to the pupil of the present shooting lenses 210.

Then, from the image data stored in the memory 163B, the image data of the photoelectric conversion element 162*a* corresponding to the obtained optical axis center of each micro lens 161*a* or corresponding to adjacent area around the center is extracted. In the photo-detector array 162 having photoelectric conversion elements 162*a* as illustrated in FIG. 3D, the image data is extracted with respect to a center positioned photoelectric conversion element 162*c* illustrated as filled area in FIG. 3D, for instance.

If the distance to the pupil of the shooting lenses 210 is unknown, an estimated center position may be utilized by setting the distance to the pupil as an infinite distance, and calculating the center position only based on the positional relationship between the micro lens 161*a* and the photoelectric conversion elements 162*a*.

After determining the optical axis center of each micro lens, in order to estimate a spherical aberration of the shooting lenses 210, a plurality of base line lengths are set on the optical axis center to be each center point thereof. A lens has a focal point position varying dependently on an optical beam size represented by an aperture value F, and the degree of the varying varies from lens to lens and with individual variability in manufacturing even if the same type of lens is adopted. Consequently, as illustrated in FIGS. 3E to 3H, a pair of photoelectric conversion elements 162*d* and 162*d* are selected such that the pair of photoelectric conversion elements 162*d* and 162*d* are located in bilaterally symmetric to each other about the photoelectric conversion element 162*c* corresponding to the optical axis center of the micro lens.

Figure 3E:
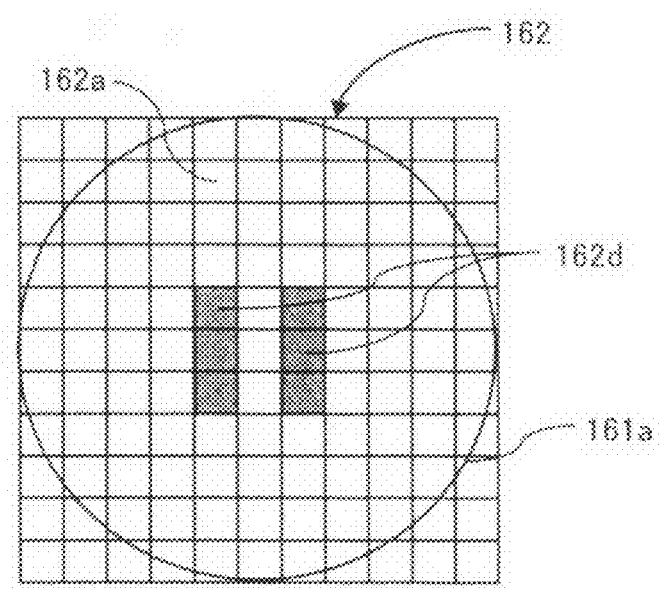
FIG. 3E is a plan view illustrating an example of selecting a pair of photoelectric conversion elements in the certain portion of the focus detecting optical system and the focus detecting sensor illustrated in FIG. 3D.
Figure 3F:
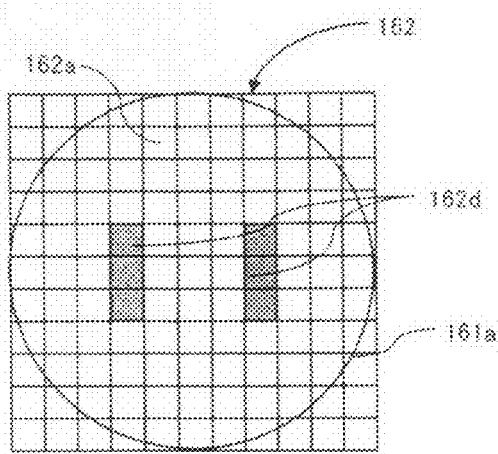
FIG. 3F is a plan view illustrating an another example of selecting a pair of photoelectric conversion elements in the certain portion of the focus detecting optical system and the focus detecting sensor illustrated in FIG. 3D.
Figure 3G:
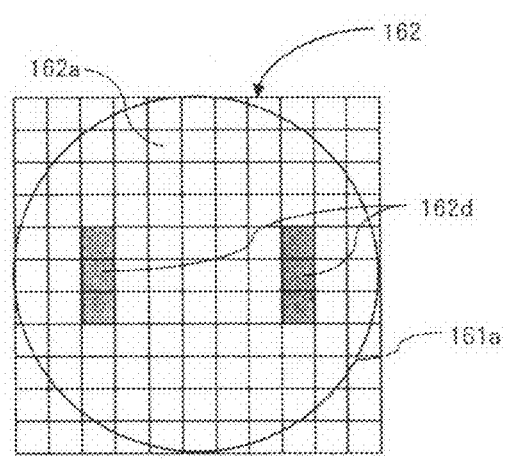
FIG. 3G is a plan view illustrating yet another example of selecting a pair of photoelectric conversion elements in the certain portion of the focus detecting optical system and the focus detecting sensor illustrated in FIG. 3D.
Figure 3H:
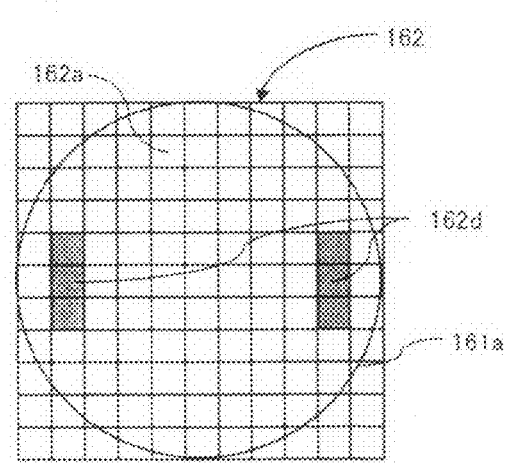
FIG. 3H is a plan view illustrating still another example of selecting a pair of photoelectric conversion elements in the certain portion of the focus detecting optical system and the focus detecting sensor illustrated in FIG. 3D.

Assuming that a focal distance of the micro lens 161*a* each illustrated in FIGS. 3E to 3H is 90 μm and a size of each photoelectric conversion element 162*a* is 3.2 μm×3.2 μm, and considering the fact that the aperture value F is a value obtained through dividing the focal distance by an effective aperture (pixel spacing), there may be obtained an optical information that F=14 when selected with spacing of 2 pixels as illustrated in FIG. 3E, F=7 when selected with spacing of 4 pixels as illustrated in FIG. 3F, F=4.7 when selected with spacing of 6 pixels as illustrated in FIG. 3G, and F=3.5 when selected with spacing of 8 pixels as illustrated in FIG. 3H. In addition, although not illustrated, when selected with spacing of 10 pixels, an optical information of F=2.8 may be obtained. The relationship between the pixel spacing and the aperture value is illustrated as a table in FIG. 5.

Here, each photoelectric conversion element 162a has a conjugate relationship with the corresponding position on the pupil of the shooting lenses 210, and therefore the optical information obtained in such a manner reflects a correlationship with the relationship between various aperture values F and the focal point positions corresponding thereto.

There is provided a calculated aperture value selection unit 163D as illustrated in FIG. 2, which outputs to a pixel pattern table 163E step-by-step a pixel spacing for determining the base line length, such as 2 pixels in the first step, 4 pixels in the second step, 6 pixels in the third step, and 8 pixels in the fourth step.

The upper limit of the pixel spacing is determined by the minimum aperture value possibly given by the micro lens 161a. Therefore, sufficiently small minimum aperture value of the micro lens 161a allows the shooting lenses 210 to define the upper limit of the pixel spacing by the full aperture value thereof. More specifically, after receiving a full aperture value data of the relevant shooting lenses 210 from the lens barrel 200, the calculated aperture value selection unit 163D determines the aperture value and the pixel spacing in each step up to adjacent to the full aperture value according to the received data, and outputs step-by-step a data relevant to the aperture value and the pixel spacing.

After determining the pixel spacing based on the full aperture data of the shooting lenses 210, a pixel selection unit 163F extracts a pixel selection pattern representing the relationship of aperture value—spacing from the pixel pattern table 163E. At this time, it is sufficient for the extracted pixel selection pattern to select only two photoelectric conversion elements 162a as the pair apart from each other at the determined spacing. Alternatively, in accordance with a condition such as an incident light amount, a plurality of photoelectric conversion elements 162a arranged orthogonally to the base line may be selected for each of the pair. FIGS. 3E to 3H illustrate the case where each three photoelectric conversion elements 162a are selected.

The photoelectric conversion elements 162a to be actually utilized are specified in accordance with the optical axis center position obtained in the micro lens optical axis center determining unit 163C and the pixel selection pattern extracted from the pixel pattern table 163E.

There is provided a target detection string extracting unit 163G which reads out from the memory 163B and accumulates the output from each photoelectric conversion element 162a of the pair determined by the pattern, and generates a focus detecting signal presenting an image offset amount caused from a pair of optical beams through different pupil areas of the shooting lenses 210. The focus detecting signal is provided as a pair of signal strings for focus detecting, which are referred to as a first signal string {aj} and a second signal string {bj}, where j is natural number, and the first and the second signal strings are output to an image offset amount calculating unit 163H after being extracted by the target detection string extracting unit 163G.

The image offset amount calculating unit 163H performs a detection of focal point position by means of a pupil division phase difference method. More specifically, the image offset amount calculating unit 163H performs a calculation of an image offset using the first signal string {aj} and the second signal string {bj}, and calculates a defocus amount. Assuming that, as the first signal string {aj} and the second signal string {bj}, a signal of aj (j=1, 2, ..., N) and a signal of bj (j=1, 2, ..., N) are stored, respectively, from the positions symmetric to each other along the base line in each micro lens 161a and about the center thereof, the focal point position, which has one-to-one relationship with a shift amount of the focal point from the possible focusing plane, appears as a parallax between two positions in the pupil each optically conjugate to the relevant photoelectric conversion element 162a. In other words, a single dimensional curve given by a data string clipped out from N micro lenses 161a differs in accordance with the parallax between the first signal string {aj} and the second signal string {bj}. Thus, the focus detecting calculation in the image offset amount calculating unit 163H is explained as obtaining a phase shift amount between two data strings with the assumption that approximately equivalent images are reflected on the two data strings.

In this calculation, the difference between the first signal string {aj} and the second signal string {bj} is calculated with changing relatively the suffix numbers of the two sequences, and the shift amount giving the minimum difference is obtained. Firstly, a correlation calculation value Dk with respect to a pair of images (signal strings) is calculated from the following equation utilizing the first signal string {aj} and the second signal string {bj}.

$$Dk = \Sigma |a_{i+k} - b_i| \qquad \text{[Equation 1]}$$

Dk given by equation 1 takes discrete values, then the minimum value thereof may be regarded as existing in the vicinity of true minimum value. Therefore, the shift amount x is calculated by means of an interpolation utilizing two Dk values preceding and next to the minimum value of Dk. If each spatial variation of the first signal string {aj} and the second signal string {bj} is given by a sinusoidal variation, then D(x) regarded as a continuous function takes absolute values of the sinusoidal curve, thus the position where D(x) becomes minimal may be obtained easily by a linear approximation based on the discrete values of Dk.

Figure 6:
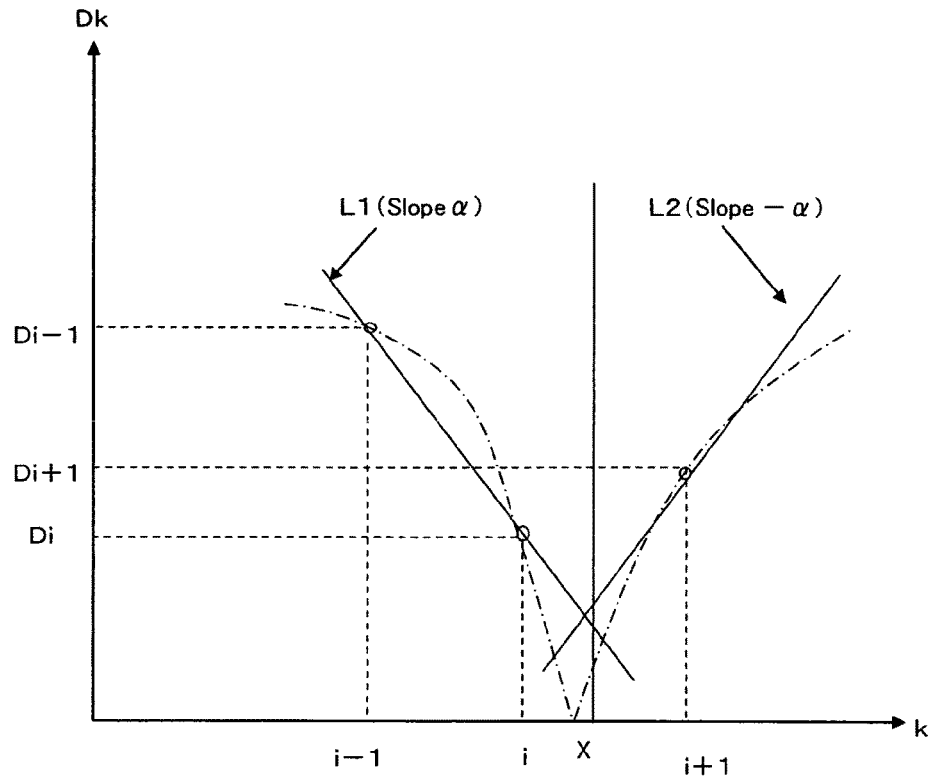
FIG. 6 illustrates a graph for describing a method of calculating a shift amount x in the focus detecting apparatus provided in the camera illustrated in FIG. 1.

FIG. 6 illustrates a graph for describing a method of calculating the shift amount x in the focus detecting apparatus according to the present embodiment. Now, let Dk giving the minimum be Di, and Dks adjacent thereof be Di+1 and Di−1, as indicated in FIG. 6. At first, greater one is selected from Di+1 and Di−1. In this example illustrated in FIG. 6, Di−1 is greater than Di+1, then Di−1 is selected. Next, the selected Di−1 and the minimum Di are connected by a straight line L1 having a slope of α. Then, a straight line L2 having a slope of =α and passing through Di+1 is set, and the point of intersection of straight lines L1 and L2 is obtained. Thus, x of the point of intersection gives the shift amount x described above.

In the image offset amount calculating unit 163H, after calculating the focal point position with respect to a certain pixel spacing (2 pixels, for example), namely a certain aperture value (F=14, for example), similar processing is performed for the next pixel spacing (4 pixels and F=7, for example), and the focal point position for the relevant aperture value is calculated. Thus, the processing tasks are repeated for every pixel spacing as illustrated in the table of FIG. 5, and obtained data result for each focal point position is stored into a storage unit 163J.

Figure 7:
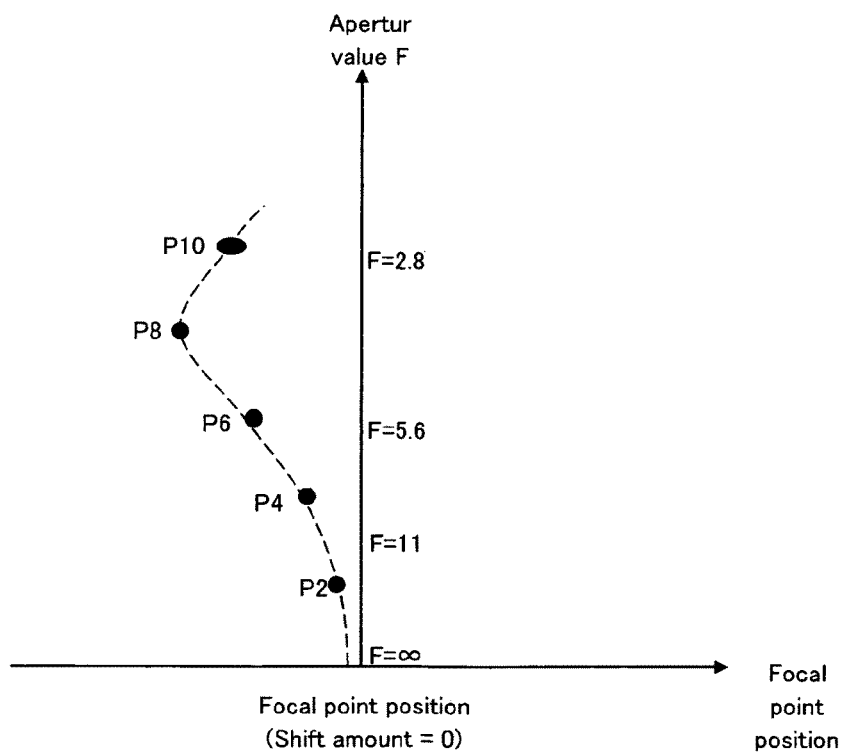
FIG. 7 is a graph illustrating a relationship between a focal point position and an aperture value required in the focus detecting apparatus illustrated in FIG. 1.

Illustrated in FIG. 7 is an example of the storage where the calculation results are indicated as filled circles for the pixel spacing of 2, 4, 6, 8, and 10 as indicated in FIG. 5 in accordance with the aperture values F. Given by the filled circles represent the spherical aberration of the shooting lenses 210 as discrete values. There is provided a correction unit 163K which reads in an actual aperture value f for shooting, refers to a table stored in the storage unit 163J relevantly to the graph illustrated in FIG. 7, utilizes an interpolation method or an extrapolation method for adjacent measurement values, and corrects to an optimum focal point position where the image offset amount caused from the spherical aberration of the shooting lenses 210 becomes zero.

Here, the aperture value f is obtained through dividing a focal distance by an effective aperture. Therefore, utilizing the reciprocal 1/f of the aperture value f enables a correction under the linear relationship of pixel dimension—effective aperture. That is, in the correction table, the reciprocal 1/f of the relevant aperture value f is associated with each measured value.

Supposing that the reciprocal 1/f of the aperture value f is xi and the measured value is yi, the correction table is provided as $\{xi, yi\}$, where $xi<x_{i+1}$. Then, after reading an actual shooting aperture value f and obtaining the reciprocal ff=1/f thereof, xi satisfying the condition of $xi \leq ff \leq x_{i+1}$ is obtained by means of an interpolation method. If there is no solution satisfying the condition of $xi \leq ff \leq x_{i+1}$, then the solution exists at out of the correction table, and xi is obtained by means of an extrapolation under the condition of xi=x0 or $xi=x_{n-1}$ (n being the final numeral of the correction table). Thus, after obtaining a distribution coefficient s from the equations 2 below and calculating proportionally adjacent measured values under the usage of the distribution coefficient s, the focal point position Y corresponding to the actual shooting aperture value may be calculated.

$$s=(ff-xi)/(x_{i+1}-xi)$$

$$Y=(1-s) \cdot yi + s \cdot y_{i+1}$$ [Equations 2]

Alternatively, this correction may be performed by means of a spline function.

Referring again to FIG. 2, the lens driving amount calculation unit 164 receives the shift amount x transmitted from the focus detecting calculation unit 163, calculates a lens driving distance Δd for making the shift amount x zero, and outputs the calculated result to the lens driving controller 165.

The lens driving controller 165 transmits a driving command to the lens driving motor 230 while receiving the lens driving distance Δd transmitted from the lens driving amount calculation unit 164, and drives the focus lens 211 in accordance with the lens driving distance Δd.

As described above, according to the present embodiments, the camera 1 calculates focal point positions corresponding to a plurality of pixel spacings, namely a plurality of aperture values, based on the image obtained in the focus detecting sensor 162, and obtains a focal point position of optical beam corresponding to an actual shooting aperture value based on the calculated focal point positions. Therefore, it becomes possible to detect a focal point accurately even though various shooting lenses are applied with difference in the degree of varying of the focal point position caused from a spherical aberration.

Another Embodiments

In the above described embodiments, the micro lens array 161 having circular formed micro lenses 161a arranged in a matrix, as illustrated in FIG. 3B, is used. Alternatively, a micro lens array 161 having regular hexagonal micro lenses 161a arranged densely in a honeycomb structure may be used.

Figure 8A:
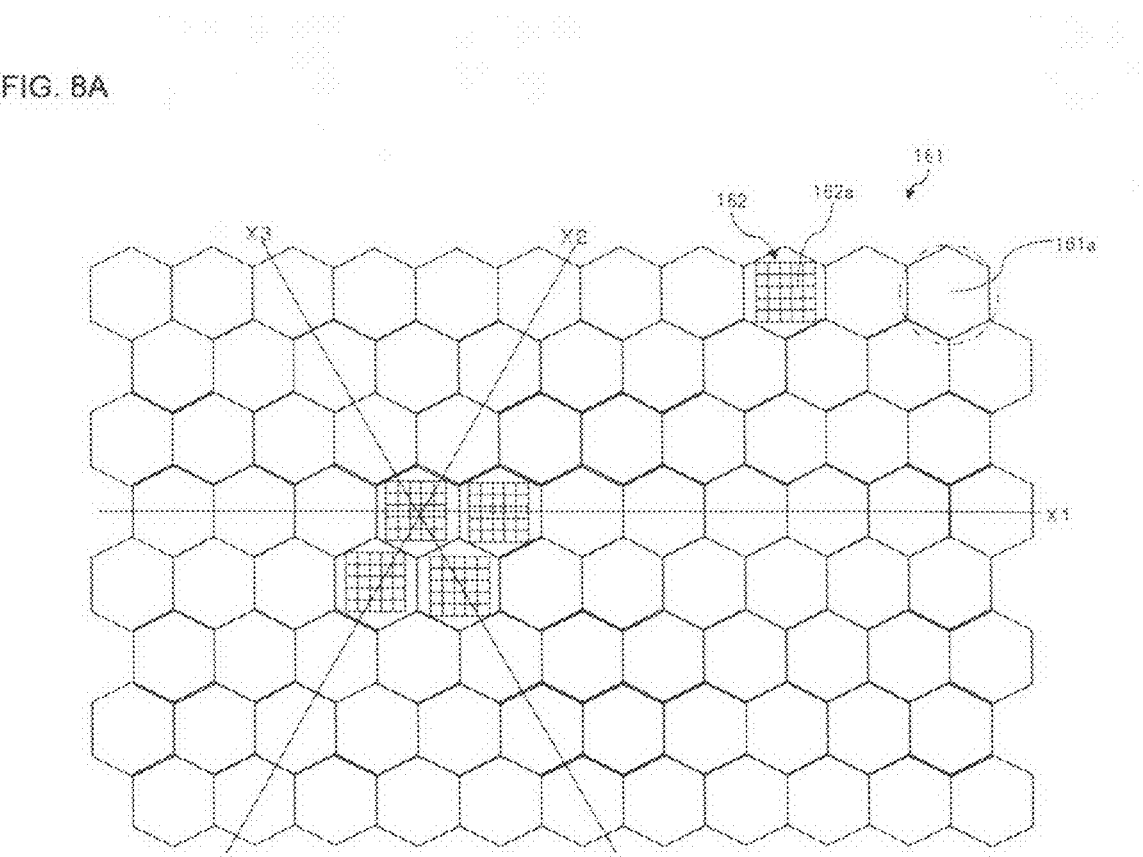
FIG. 8A is a plan view illustrating a placement relationship of a focus detecting optical system and a focus detecting sensor provided in the camera illustrated in FIG. 1 according to an another embodiment.
Figure 8B:
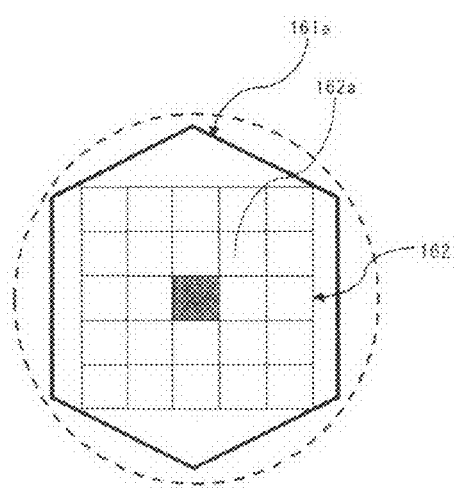
FIG. 8B is an enlarged plan view illustrating a certain portion of the focus detecting optical system and one focus detecting sensor illustrated in FIG. 8A.

FIG. 8A is a plan view illustrating a placement relationship of the focus detecting optical system and the focus detecting sensor seen from the sub mirror 122 to the micro lens array 161. The photoelectric conversion elements 162a are illustrated in FIG. 8A behind only some of the micro lenses 161a, it is to be understood, however, that the photoelectric conversion elements 162a exist in a similar manner behind other ones. FIG. 8B is an enlarged plan view illustrating one micro lens and one focus detecting sensor.

The focus detecting optical system 161 according to the present embodiment, is provided as the micro lens array having the plurality of micro lenses 161a arranged densely in a two-dimensional plane (in a honeycomb structure) as illustrated in FIG. 8A, and is allocated adjacent to the position P1 to be a possible focusing plane, similarly as the above-mentioned embodiment illustrated in FIG. 3A.

In contrast, the focus detecting sensor 162 is provided as a photo-detector array having a plurality of photoelectric conversion elements 162a densely arranged in a matrix in a two-dimensional plane, as illustrated in FIG. 8A, and is allocated approximately on focal points of the micro lens array 161, similarly as that illustrated in FIG. 3C.

Each micro lens 161a according to the present embodiment, is formed as being cut out from a circular formed micro lens with a lens surface indicated by one-dot chain line into a regular hexagon, and has similar functional capability with the circular formed micro lens. Thus, the micro lens array 161 is formed as being arranged with such regular hexagonal micro lenses 161a in a honeycomb structure.

Arranging regular hexagonal micro lenses 161a in a honeycomb structure in such a manner enables to avoid dead zones of focus detecting caused possibly between circular formed micro lenses. Directions of up and down, and left and right indicated in FIG. 8A are similar to those in an image picked up by the image sensor 110.

On the other hand, the photo-detector array 162 provided behind the micro lens array 161 has, similarly as the above-mentioned embodiment, a plurality of square shaped photoelectric conversion elements 162a arranged in a matrix. Each of the photoelectric conversion elements 162a is formed smaller than each micro lens 161a, and therefore, as illustrated enlargedly in FIG. 8B, a plurality of photoelectric conversion elements 162a are included in an area to which one micro lens 161a is projected perpendicularly.

In the present embodiment, the micro lens array 161 is provided in such a manner that the regular hexagonal micro lenses 161a are arranged in a honeycomb structure, as illustrated in FIG. 8A, and therefore the sequence or the arrangement of image data becomes to have a honeycomb structure.

Also according to the present embodiment, focal point positions corresponding to a plurality of pixel spacings, namely a plurality of aperture values are calculated based on the image obtained in the focus detecting sensor 162, and a focal point position of optical beam corresponding to an actual shooting aperture value is obtained based on the calculated focal point positions. Therefore, it becomes possible to detect a focal point accurately even though various shooting lenses are applied with difference in the degree of varying of the focal point position caused from a spherical aberration.

It is to be understood that, although the photo-detector array 162 is illustrated in FIGS. 3D and 8B as having a plurality of photoelectric conversion elements 162a arranged in matrix for each micro lens 161a, the number and the arrangement of the photoelectric conversion elements 162a for each micro lens 161a are not limited to those illustrated. Alternatively to arranging the photoelectric conversion elements 162a for each micro lens 161a, only one photo-detector array 162 may be provided for the plurality of micro lenses 161a or for the micro lens array 161 in its entirety. Or alternatively to arranging the square shaped photoelectric conversion elements 162a in a matrix, regular hexagonal photoelectric conversion elements may be arranged in a honeycomb structure.

Moreover, in the above-mentioned embodiments, the focus detecting sensor 162 is provided as a two-dimensional sensor independently from the image sensor 110. Alternatively, micro lenses 161a and photoelectric conversion elements 162a may be provided as a portion of the image sensor 110 in a similar manner, thereby to enable focus detecting through the process described above.

It should be noted that the present invention is also applicable to a hybrid AF (auto focusing) in which an AF according to a pupil division phase difference detecting method and an AF according to a contrast method (so-called mountain climbing AF) are utilized in combination.

EXPLANATION OF REFERENCE NUMBERS

1; single-lens reflex digital camera
100; camera body
110; image sensor
161; focus detecting optical system (micro lens array)
　161a; micro lens
162; focus detecting sensor (photo-detector array)
　162a; photoelectric conversion element
163; focus detecting calculation unit
　163C; micro lens optical axis center determining unit
　163D; calculated aperture value selection unit
　163E; pixel pattern table
　163F; pixel selection unit
　163G; target detection string extracting unit
　163H; image offset amount calculating unit
　163J; storage unit
　163K; correction unit
164; lens driving amount calculation unit
200; lens barrel
210; shooting lenses
211; focus lens

What is claimed is:

1. A focus detecting apparatus for detecting an image offset of an optical system, comprising:
   a micro lens array arranged with a plurality of micro lenses densely arranged in a matrix in a two-dimensional plane, and allocated adjacent to a position to be a possible focusing plane;
   a photo-detector having a plurality of detecting elements densely arranged in a matrix in a two-dimensional plane, allocated approximately on focal points of the micro lens array, the plurality of detecting elements being provided so as to correspond to each of the plurality of micro lenses, and receiving an optical beam from the optical system via the plurality of micro lenses; and
   a calculator that
      reads out outputs from the plurality of detecting elements corresponding to the plurality of micro lenses in accordance with a focus detecting point,
      respectively selects a pair of detecting elements of the plurality of detecting elements, located symmetrically with respect to each other about the plurality of detecting elements and receiving respectively a pair of optical beams passing through different areas of the optical system, from the plurality of detecting elements in accordance with a plurality of aperture values of the optical system, and
      calculates the image offset of the optical system based on outputs from the pair of detecting elements.

2. The focus detecting apparatus according to claim 1, wherein
   the calculator calculates a plurality of image offsets corresponding to the plurality of aperture values, and further calculates an image offset corresponding to a specific aperture value based on a calculation result of the plurality of image offsets.

3. The focus detecting apparatus according to claim 2, wherein
   the calculator calculates an image offset corresponding to a specific aperture value different from the plurality of aperture values based on a calculation result of the plurality of image offsets.

4. The focus detecting apparatus according to claim 1, wherein
   the calculator calculates the image offset of the optical system based on outputs from the plurality of detecting elements corresponding to a micro lens of the plurality of micro lenses, the micro lens being selected from the plurality of the micro lenses in accordance with an image height of an image obtained by the optical system.

5. The focus detecting apparatus according to claim 1, wherein
   the calculator selects different pairs of the detecting elements of the plurality of detecting elements in accordance with an arrangement position of the plurality of micro lenses on the micro lens array.

6. An imaging apparatus comprising a focus detecting apparatus detecting an image offset of an optical system, and an imaging unit taking an image from the optical system, the focus detecting apparatus comprising:
   a micro lens array arranged with a plurality of micro lenses densely arranged in a matrix in a two-dimensional plane, and allocated adjacent to a position to be a possible focusing plane;
   a photo-detector having a plurality of detecting elements densely arranged in a matrix in a two-dimensional plane, allocated approximately on focal points of the micro lens array, the plurality of detecting elements being provided so as to correspond to each of the plurality of micro lenses, and receiving an optical beam from the optical system via the plurality of micro lenses; and
   a calculator that
      reads out outputs from the plurality of detecting elements corresponding to the plurality of micro lenses in accordance with a focus detecting point,
      respectively selects a pair of detecting elements of the plurality of detecting elements, located symmetrically with respect to each other about the plurality of detecting elements and receiving respectively a pair of optical beams passing through different areas of the optical system, from the plurality of detecting elements in accordance with a plurality of aperture values of the optical system, and
      calculates an image offset of the optical system based on outputs from the pair of detecting elements.

7. The imaging apparatus according to claim 6, wherein
   the calculator obtains the image offset corresponding to a controlled aperture value of the optical system in case of shooting by the imaging unit, and further comprising a focus detector that detects a focusing adjustment status in accordance with the obtained image offset.

8. The imaging apparatus according to claim 7, further comprising a contrast detector that detects a contrast of an image obtained by the optical system based on an output from the photo-detector corresponding to the plurality of micro lenses, wherein
the focus detector detects a focusing adjustment status based on an output from the photo-detector of which the contrast detected by the contrast detector is not less than a predetermined value.

9. The imaging apparatus according to claim 6, further comprising a storage unit that stores the image offset calculated by the calculator in accordance with the plurality of aperture values.

* * * * *